United States Patent
Lahtinen et al.

(10) Patent No.: US 9,100,857 B2
(45) Date of Patent: Aug. 4, 2015

(54) METHOD AND SYSTEM WITH IMPROVED DISASTER RECOVERY CAPABILITY

(75) Inventors: Olli Pekka Lahtinen, Espoo (FI); Mika Lahti, Espoo (FI); Tapio Savunen, Helsinki (FI)

(73) Assignee: CASSIDIAN FINLAND OY, Helsinki (FI)

(*) Notice: Subject to any disclaimer, the term of this patent is extended or adjusted under 35 U.S.C. 154(b) by 211 days.

(21) Appl. No.: 13/816,949

(22) PCT Filed: Aug. 24, 2011

(86) PCT No.: PCT/EP2011/064538
§ 371 (c)(1),
(2), (4) Date: Feb. 14, 2013

(87) PCT Pub. No.: WO2012/025562
PCT Pub. Date: Mar. 1, 2012

(65) Prior Publication Data
US 2013/0150107 A1    Jun. 13, 2013

(30) Foreign Application Priority Data
Aug. 25, 2010 (EP) .................................. 10173962

(51) Int. Cl.
*H04B 7/00* (2006.01)
*H04W 24/04* (2009.01)
(Continued)

(52) U.S. Cl.
CPC ............... *H04W 24/04* (2013.01); *H04M 3/12* (2013.01); *H04W 36/16* (2013.01); *H04W 88/12* (2013.01); *H04W 88/14* (2013.01)

(58) Field of Classification Search
CPC ..... H04W 36/16; H04W 24/04; H04W 88/14; H04W 92/12

USPC ............. 455/507, 508, 67.11, 500, 517, 524, 455/525, 512, 516, 422.1, 403, 435–444, 455/433, 432.1, 412.1, 426.1, 426.2, 455/424.445, 550.1, 561; 370/310, 328, 370/329, 338, 343

See application file for complete search history.

(56) References Cited

U.S. PATENT DOCUMENTS 6,223,049 B1 * 4/2001 Aakula et al. ................ 455/519
2003/0050097 A1 * 3/2003 Amirijoo et al. ............. 455/560
(Continued)

FOREIGN PATENT DOCUMENTS

EP       1983777 A1    10/2008
EP       2003913 A2    12/2008

OTHER PUBLICATIONS

International Search Report and Written Opinion dated Sep. 30, 2011 corresponding to International Patent Application No. PCT/EP2011/064538.
(Continued)

*Primary Examiner* — Keith Ferguson
(74) *Attorney, Agent, or Firm* — Squire Patton Boggs (US) LLP

(57) ABSTRACT

A recovery scheme where a base station monitors state of interoperation with a primary exchange. When the primary exchange becomes unavailable, active services may be lost, but the base station sends an activation request message to a secondary exchange that has access to base station configuration information of the base station. The secondary exchange uses the base station configuration information to activate the base station, and user terminals in the base station cell may begin to registrate to the system. Recovery capability of communications can be achieved with optimized use of network resources.

18 Claims, 6 Drawing Sheets

(51) Int. Cl.
*H04M 3/12* (2006.01)
*H04W 36/16* (2009.01)
*H04W 88/14* (2009.01)
*H04W 88/12* (2009.01)

(56) References Cited

U.S. PATENT DOCUMENTS

2009/0131061 A1* 5/2009 Palanki et al. ............... 455/446

2009/0239536 A1* 9/2009 Fallgren et al. ............... 455/436

OTHER PUBLICATIONS

Ericsson, "Support for Multi-to-Multi Relationship Between MME/UPEs and Node Bs (S1-flex)," 3GPP Draft; S2-060087, 3rd Generation Partnership Project (3GG), vol. SA WG2, Jan. 10, 2006, XP050254467.

* cited by examiner

METHOD AND SYSTEM WITH IMPROVED DISASTER RECOVERY CAPABILITY

FIELD OF THE INVENTION

The present invention relates to telecommunications and especially to telecommunications systems where communications between user terminals requires interoperation of a base station and an exchange.

BACKGROUND ART

The importance of reliable and continuous communications for critical functions has consistently increased. Protection of data and information technology services in the event of a disruptive situation has become an emphasized and visible priority.

Recovery capability of a telecommunications system is considered to represent the ability to return to a state where users of the telecommunications system may communicate with each other. In full recovery the telecommunications system typically returns to its original state, but recovery may be achieved also with lower level of services, as long as some type of communication is available to users. Recovery planning is an important aspect of network planning of telecommunications systems and involves defining recovery objectives and determining the most suitable recovery strategy for each part of the system.

An important object in recovery planning of mobile communications systems is thus to improve the security and reliability of communications between base stations and mobile switching exchanges. Conventionally these aspects have been dealt with in network planning by carefully designed duplication and redundancy schemes. However, the inevitable dilemma in recovery planning is that any recovery object metrics need to fit with the available budget. The cost associated with a target level of protection has easily made a desired corresponding high availability solution impractical. It is considered important to find ways to enhance recovery capability of a telecommunications system without significantly increasing the network resources required to achieve that.

SUMMARY

Aspects of the invention allow provision of telecommunications services with improved recovery capability scheme and are defined in claims comprising independent method claims, a claim for an inter-related apparatus, and for an inter-related computer program product. Preferred embodiments of the invention are disclosed in the dependent claims.

In aspects of the invention, base stations have been arranged to monitor the status of the connection to their primary exchange, and trigger a transition to an assigned secondary exchange if a problem in the connection is detected. Recovery capability of communications can be achieved with optimised use of network resources.

BRIEF DESCRIPTION OF THE DRAWINGS

In the following, embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may be combined to provide other embodiments.

In the following, different embodiments will be described with one example of system architecture of a telecommunications system without, however, restricting the invention to the disclosed exact terms and structures. The invention is applicable to any telecommunications system where communications between user terminals requires interoperation of a base station and an exchange. A variety of system configurations applying a variety of communications technologies may be used separately or in combinations to implement the embodiments of the invention. Communications systems and technologies evolve continuously, and embodiments of the invention may require a number of modifications that are basically obvious for a person skilled in the art. Therefore all words and expressions of this specification should be interpreted broadly, as they are intended merely to illustrate, not to restrict, the embodiments.

Figure 1:
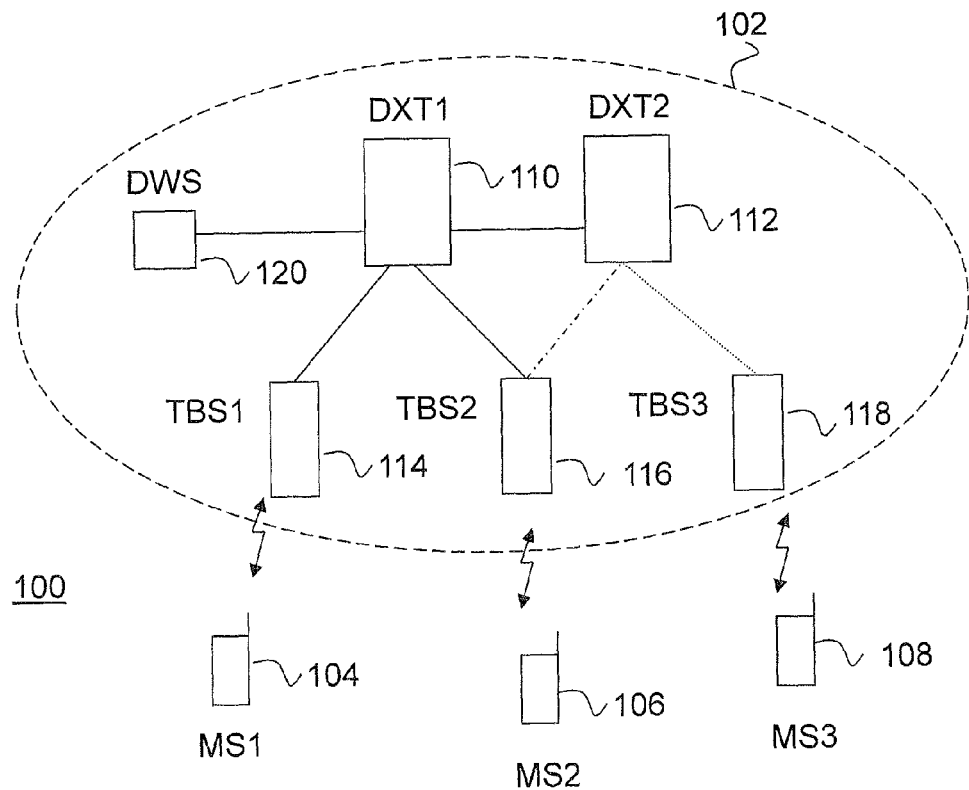
FIG. 1 illustrates elements of a telecommunications system.

In FIG. 1 the principles of the telecommunications system are described by means of a mobile communications system applying Terrestrial Trunked Radio (TETRA) technology, without limiting the invention to this one radio system technology. The description uses terms and elements of the TETRA air interface as specified in the European Telecommunication Standards ETSI EN 300 392-2; European Standard (Telecommunications series); Terrestrial Trunked Radio (TETRA); Voice plus Data (V+D); Part 2: Air Interface (AI), and ETSI TR 102 580; Terrestrial Trunked Radio (TETRA); Release 2; Designer's Guide; TETRA High-Speed Data (HSD); TETRA Enhanced Data Service (TEDS).

The telecommunications system 100 comprises a switching and management infrastructure (SwMI) 102 and one or more user terminals (MS) 104, 106, 108. SwMI 102 is equipment for a voice plus data (V+D) network, which enables user terminals to communicate with each other. In FIG. 1 SwMI is illustrated with some digital exchanges (DXT) 110, 112, and base stations (TBS) 114, 116, 118. The number of elements and their mutual interconnections in SwMI may naturally vary according to the implementation.

A mobile station (MS) 104, 108 106, represents a user terminal that arranged to access SwMI via a radio interface provided by SwMI. A communications system may comprise also other types of user terminals that apply other types of interfaces. For example, a TETRA dispatching workstation DWS 120 may communicate with SwMI 102 through a dispatching interface that applies, for example, E1, ISDN BA, or IP protocols. Additionally, SwMI 102 may provide one or more interfaces for interconnection with user terminals in other networks, such as PSTN, GSM, WCDMA, conventional analog networks, LAN, WAN, and similar. The various protocols related to different interfaces are implementation specific arrangements familiar from the prior art.

A mobile station 104, 106, 108 applying a radio interface according to TETRA standard definitions may connect with SwMI 102. SwMI 102 may provide users with circuit mode calls and delivery of short data messages and Internet Protocol (IP) packet data. IP packet data may be used by applications running directly within the mobile station or by external data terminals (not shown) that may be connected with the mobile station, for example via a Peripheral Equipment Interface (PEI) defined in TETRA standards.

TETRA technology, as such, is extensively documented and well known to a person skilled in the art. In the present example, a TETRA mobile station (MS) represents a user terminal entity that is formed by any type of subscriber identification element and terminal equipment that implements TETRA air interface communications. A TETRA base station (TBS) represents here a SwMI element that is responsible for radio transmission and reception to or from the mobile stations. TETRA base station is connected to a TETRA Digital Exchange (DXT) that represents here a controller element that monitors the operations in the network and facilitates delivery of information between base stations, thus enabling communications between user terminals under these base stations. DXT is typically an aggregate of traffic carrying devices, switching stages, controlling and signalling means and other functional units, which enables subscriber lines, telecommunication circuits and/or other functional units to be interconnected for communications between individual users. In other network configurations, the control functions discussed in the following may be implemented in one or more other type of controlling elements.

The European Telecommunications Standards Institute (ETSI) standard EN 300 392-2 V3.2.1 is the first version of a TETRA standard that incorporates also a High-Speed Data (HSD) enhancement, generally referred to as "TEDS" or TETRA Enhanced Data Service. This incorporation has resulted in definitions for an enhanced air interface known as the TETRA Release 2 air interface. As a measure of integration, the 4-slot TDMA access structure of the air interface plus its TDMA frames, slots and subslots is preserved and access to the HSD channels is allowed via the TETRA Release 1 common control channel. The HSD channels employ additional modulations and channel codings, various coding rates and HSD channel bandwidths.

Accordingly, an integrated TETRA network may comprise conventional infrastructure elements and high-speed data enhanced infrastructure elements. A conventional mobile station comprising a TETRA Release 1 transceiver is able to communicate conventionally via the TETRA Release 1 air interface with the TETRA Release 1 infrastructure. Base stations of the enhanced infrastructure may be enhanced to have conventional TETRA Release 1 transceivers and additionally one or more high-speed data transceivers. The conventional mobile station may thus be able to communicate also via an enhanced base station, and the common infrastructure using all services and facilities offered by the TETRA Release 1 network whilst ignoring any high-speed data related signaling. On the other hand, an enhanced high-speed data enabled mobile station that may comprise a conventional TETRA Release 1 transceiver in addition to a high-speed data transceiver and may receive and/or transmit data over a conventional TETRA Release 1 channel and/or an enhanced high speed data channel.

Notwithstanding whether conventional or enhanced TETRA air interface is applied, TETRA networks use technology and a hierarchical topology common for cellular networks. Transmission of an individual user terminal is picked up by a base station, each of which is connected to an exchange. A transmitted message is forwarded to the exchange that may deliver it to remote dispatcher sites or control rooms, directly to other radio terminals within the network or linked externally to other networks or the public switched telephone network. The connection or backhaul of the TETRA radio traffic from the base station sites to the exchanges, as well from the exchanges to the dispatcher sites, is generally dependent on conventional terrestrial or wireless data communications lines, typically implemented with X.21 or E1 network interfaces. The growing availability of packet-switched networks has also raised interest to implementations where voice and data is transported over Ethernet, Internet Protocol (IP) and Multiprotocol Label Switching (MPLS) networks.

As for recovery planning, there are some conventional methods for dealing with problems in interaction between an exchange and a base station controlled by it. For example, the transmission system may be designed to provide alternative routes for transmissions between the base station and the exchange. This arrangement helps to overcome failures in transmission lines but does not help in case a whole exchange falls.

For ultimate situations, some advanced base stations may be configured to operate temporarily in fallback mode, i.e. provide some basic communication services without any additional control by the exchange. This is an efficient arrangement, but facilitates communications only locally in the cell of the base station in fallback mode.

In some conventional dual homing systems, configuration information of a controlled element is stored in a primary controlling element and in at least one secondary controlling element that preferably locates in another physical entity. In an existing dual homing concept described for telecommunications, for full operability at all circumstances, a controlled element is configured to a primary exchange, and to at least one secondary exchange called a virtual exchange. The primary exchanges and virtual exchanges are interconnected and the state of each virtual controlling element is kept aligned to the state of its respective primary controlling element through a heartbeat connection. Virtual controlling elements are in idle state, but if they detect that the heartbeat is lost or that the primary controlling element in the other end of the heartbeat connection is in inoperative state, they switch their own management state from idle to active and immediately take over the controlled element.

The problem in applying this kind of arrangement to recovery planning of exchanges of telecommunications systems is that it is responsive only to the loss of heartbeat connection between the primary exchange and the virtual exchange. However, it is possible that the route, and even alternative routes for transmissions between the base station and the primary exchange may be lost, even if the heartbeat connection between the exchanges may work normally. A reliable recovery planning scheme should be able to expeditiously cover also these kinds of situations.

In addition, communications operations, and operations related to communications operations take place rapidly and the transaction volumes are remarkable. Distributing all information for instant transition capability between the two exchanges would require a significant amount of data transmissions between the exchanges.

Furthermore, in some telecommunications technologies, exchanges typically host some functional entities that collect information necessary to support active services of user terminals operating under base stations it controls from various sources. For example, a controlling TETRA exchange comprises a visitor subscriber database (VLR) that maintains subscriber profile information for all mobile stations that are currently registered to the system via the base stations it hosts. The subscriber profile information is retrieved to VLR from the home location register (HLR) of a mobile station at the time the mobile station registers to the system, basically at power-on or at location update. In a conventional arrangement was applied, subscriber profile information for VLR should be fetched, stored and processed for all registered mobile stations from all respective HLRs both in the primary exchange and in the virtual exchange.

Accordingly, retrieving and maintaining all subscriber and state data for active services of a base station in an exchange a conventional way would in practise mean assigning similar resources (computing capacity, transmission capacity, rack space, etc) for each controlled base station parallelly in at least two physical exchanges, in the primary exchange and in one or more virtual exchanges. Any information retrieved from various sources to the primary exchange should additionally be updated to the secondary exchange. Users or user organisations of telecommunications systems very seldom have resources for this kind of over-dimensioning.

On the other hand, in many cases recovery capability of the telecommunications system cannot be compromised at all. For example, communications of police and emergency rescue services cannot be completely lost for a long time during disturbances or faults in some or even several system elements. Full or at least partial recovery must be possible at all times, even when an exchange becomes completely inaccessible or inoperable.

Balancing between these competing requirements is a very demanding network design task. However, it has now been understood that in case of a major disaster, for financial restrictions it could be accepted that ongoing connections may be preliminarily lost and a temporary break of operations may take place, as long as the break is within acceptable limits, typically in the order of minutes.

Accordingly, instead of relying on the heartbeat connection and full-scale delivery of state and subscriber data between the exchanges, in the telecommunications system of FIG. 1 the base stations have been arranged to monitor the status of the connection to their primary exchange, and trigger a transition to an assigned secondary exchange if a problem in the connection is detected. During normal operations, no additional exchange of heartbeat or state information is required between the primary exchange and the second exchange. Recovery of the control operations between the exchange and the base station may be implemented by each of the exchanges responding to the request of the base station by retrieving configuration information on the base station in a predefined manner from one or more sources that are independent from accessibility of the primary exchange. Loss of connection between the primary exchange and the base station causes loss of connections in the radio interface between the base station and the user terminals. However, in the course of their normal operation, the user terminals start automatically procedures to re-registrate to the base station and as soon as the connection between the base station and the new exchange is restored, necessary registrations are made and active services are available again.

Referring to FIG. 1, let us assume that a base station TBS2 116 is configured to primary exchange DXT1 110. Configuring a base station to an exchange means that the exchange and the base station are provided with a physical connection and corresponding communication protocol stacks that allow exchange of information over that physical connection. In addition the exchange is provided with base station information. This base station information is information on the base station and on subscribers operating under the base station which needs to be available to the exchange such that the base station and the exchange can interoperate. Interoperation means here that the base station and the exchange are operatively connected with each other and the base station is able to provide a defined set of services to user terminals under it.

Figure 2:
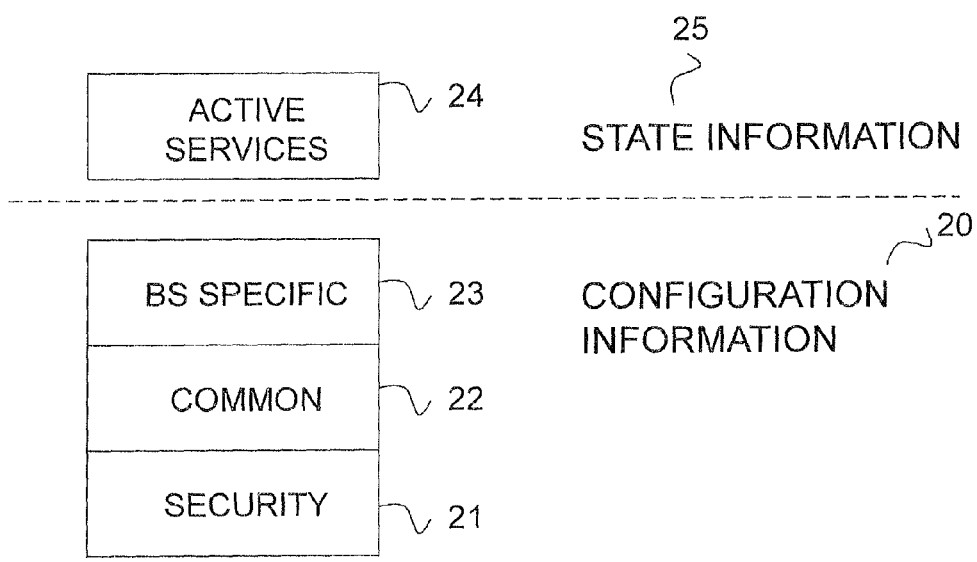
FIG. 2 illustrates logical division of base station information in an exchange.

FIG. 2 illustrates logical division of base station information required in an exchange for communications of a user terminal under a base station. The base station information comprises base station configuration information 20 and state information 25. Configuration information 20 includes information that is required to facilitate interoperability of the exchange and the base station but is not directly related to any particular service applied by the user terminal under the base station. Information that is directly related to a service refers here to information that is required by and may dynamically change during application of the service. State information 25 includes definitions, values, parameters and/or state machines required to maintain active services of the user terminal under the base station. FIG. 2 illustrates base station information required to facilitate communications of a mobile station 106 under a base station 116 via the exchange 110 of FIG. 1.

The first group of definitions 21 of the base station configuration information 20 relates to security aspects, and especially to definitions that allow the exchange to verify that the base station is authorized to operate in the network and/or that it is itself authorized to control and/or mediate operations of the base station. Basically none of the definitions need to be permanently configured to the exchange, but for maintaining any meaningful security level, this group of definitions needs to be continuously available to the exchange. The definitions may be stored in the exchange or retrievable from a source that is continuously available to the exchange. The definitions may be implemented in many ways. For example, the exchange may store a list of identities of base stations that it is allowed to operate with. Alternatively, base stations may be configured with a codeword or a key and submit that with their activation request message, and the exchange may then use the codeword or the key to authenticate the base station. Other means of verifying the right of the exchange and the base station to interoperate may be applied without deviating from the scope of protection.

The second group of definitions 22 of the base station configuration information 20 represents base station and/or subscriber parameters that are common for all base stations/subscribers of the network. These parameters are typically predefined, and vary quite slowly or possibly not at all. This second set of definitions applies to all controlled base stations, so in order to maintain capability to immediately activate a base station in the exchange, basically only one copy of the second group of definitions 22 needs to be available to the exchange. For example, the definitions may correspond with a list of parameters and/or command sequences that are uploaded to relevant functional units of the exchange when a base station is being activated. The definitions may be stored in the exchange or in a database continuously available to the exchange.

The third group of definitions 23 of the base station configuration information 20 comprises base station—specific definitions that may vary from one base station to another, but do not vary according to the services applied by mobile stations operating under the base station.

The base station state information 25 comprises definitions that may, and typically do vary according to the services applied by the mobile station operating under the base station. For example in the case of FIG. 2, a call control, subscriber management, mobility management or security management operation of the mobile station typically generates a signaling message from the base station to the exchange and results in an update in the base station state information 25 of that particular base station.

As discussed earlier, in the embodiments of FIGS. 1 and 2, the base station configuration information 20 and the base station state information 25 are treated separately such that base station state information 25 is delivered and maintained normally in the primary exchange but does not need to be regularly forwarded to any other exchange during normal operations. At a time of loss of interoperability to a primary exchange the base station state information may thus become unavailable to other elements of the communications system.

On the other hand, base station configuration information 20 is made continuously available to exchanges such that whenever an activation request from a base station arrives, the base station configuration information can be retrieved to the exchange and activated to enable communications between the base station and the exchange. Thus, when the interoperability of the exchange and the base station has been restored, the mobile stations under the base station may automatically, one by one registrate to the network, activate services and thereby start feeding in new base station state information 25.

The first and second group of definitions 21, 22 are typically relatively static and are preferably stored in the exchange itself, or in a data medium easily available, or in the immediate vicinity of the physical exchange. The third group of definitions 23 varies according to the base station and, depending on the application, may be stored in the exchange, may be retrievable to the exchange or may be submitted to the exchange by the base station providing the activation request. In case the amount of potential base stations to be activated is small enough to allow storing in the exchange without significant need for further resources, the third group of definitions 23 for all potentially controllable base stations may be stored in the exchange. Alternatively, it may be stored in a data medium easily available to the exchange, like a base station configuration server, or a database locally connected to the exchange. As a further redundancy measure the operator of the exchange may be provided with a possibility to input the third group of definitions 23 for a base station manually.

In the proposed arrangement, the exchange does not, however, need to permanently store and maintain the base station—specific information. The base stations may be configured to store their own specific configuration information and provide it in the activation request or in connection with the activation request. The exchange receiving the activation request may adopt the definitions received from the base station and is then right away ready to activate the base station operability.

Figure 3:
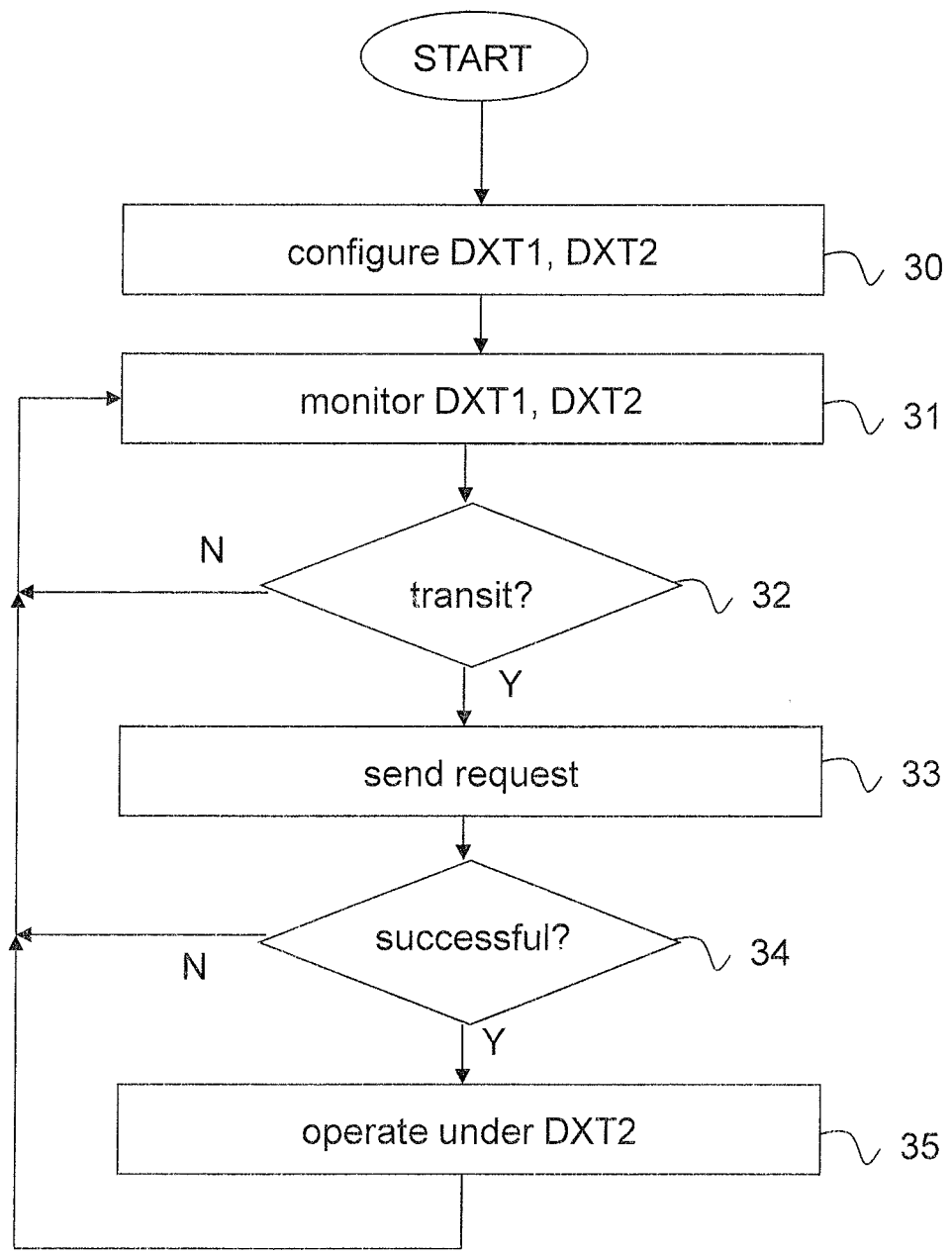
FIG. 3 illustrates a procedure implemented in a base station of FIG. 1.

FIG. 3 illustrates an embodiment of a method according to the invention by means of a procedure implemented in the base station TBS2 of FIG. 1. The procedure begins in a base station TBS2 that is switched on and operable in the network, and thereby able to connect with one or more exchanges of the network. The base station is first configured (stage 30) with physical routing information to at least two exchanges DXT1, DXT2 of the network. DXT1 is a primary exchange where the base station is in active state. This means that both the configuration information and state information of the base station are maintained in the primary exchange DXT1. DXT2 is a secondary exchange where the base station is in standby state. This means that TBS2 may connect with DXT2 and exchange at least some signalling messages with it, but DXT2 does not continuously maintain base station state information of TBS2. DXT2 is, however, configured with functionality for retrieving and activating base station configuration information for TBS2 if and when such becomes necessary.

During operations TBS2 monitors (stage 31) the state of interoperation with the primary exchange DXT1. Monitoring in this context means that the base station checks a predetermined operational characteristic that indicates whether communications with the primary exchange DXT1 are normally available or not. The way of monitoring the state of interoperation may be implemented in various ways without deviating from the scope of protection. For example, the communication protocol applied between the exchange and the base station may comprise a message exchange mechanism to continuously test and indicate whether the connection between the endpoints is available or not. The mechanism may apply signalling messages exchanged during normal operation or pilot signals dedicated for the purpose.

Based on the monitoring, TBS2 decides whether it needs to transit its communications from the primary exchange DXT1 to the secondary exchange DXT (stage 32). If the monitoring indicates that the primary exchange is, for one reason or another not available to the base station, the transition is made. TBS2 then generates an activation request message and transmits it in a signaling message to DXT2. In case the functionality of the exchanges is arranged to be independent of the base station input, the request may be a simple triggering message at the same time providing identity information of the base station. Identity information may be provided implicitly through communications protocols or explicitly in the activation request message. In case the exchanges do not store or have accessible the base station—specific part of the base station configuration information, the base station includes information for the base station—specific part of the base station configuration information into the activation request message.

After sending the activation request, TBS2 monitors the progress of activation request to determine whether the activation is successful (stage 34) and transition to DXT2 is possible or not. This monitoring may be implemented, for example, by checking whether an explicit acknowledgement message to the activation request is received within a defined response period from DXT2 or not. The acknowledgement may also be implicit, i.e. the monitoring may be implemented by checking whether the activation request is followed by ordinary signalling messages of a controlling exchange from DXT2 to TBS2. This implies that the activation of TBS2 in DXT2 is completed.

In case the connection to DXT2 is made and activation of TBS2 in DXT2 succeeds, TBS2 finalises the transition and begins to operate under control of DXT2 (stage 35). It allows mobile stations within its cell to registrate to the system via itself and DXT2. It is noted here that the flow chart of FIG. 3 (as well as later FIGS. 4 to 6) is a simple representation of the basic principles of the embodied method. The stages are not necessarily in absolute chronological order, and some of the stages may be performed in an order differing from the given one. Other functions can be executed between the stages or within the stages and other signaling messages may be transmitted between the illustrated messages. For example, a base station may be configured with one or more secondary exchanges the availability of which it may check by repeating steps 33, 34 and 35 in a defined order until an available exchange is found.

After transition to DXT2 the base station returns to stage 31 to monitor the state of interoperation with its present primary exchange DXT2. In an aspect, each base station may be configured to have one default primary exchange under which it is supposed to operate whenever possible. The monitoring stage 31 may thus be complemented with a check on state of interoperation with its default primary exchange DXT1, and stage 32 may be complemented with a decision to transit to the default primary exchange DXT1 in case restored interoperability with DXT1 is detected, notwithstanding whether the state of interoperability with DXT2 exists or not. This way the hierarchic structure of the network remains stable and adjustments to it are only temporary for the sake of managing special situations.

Figure 4:
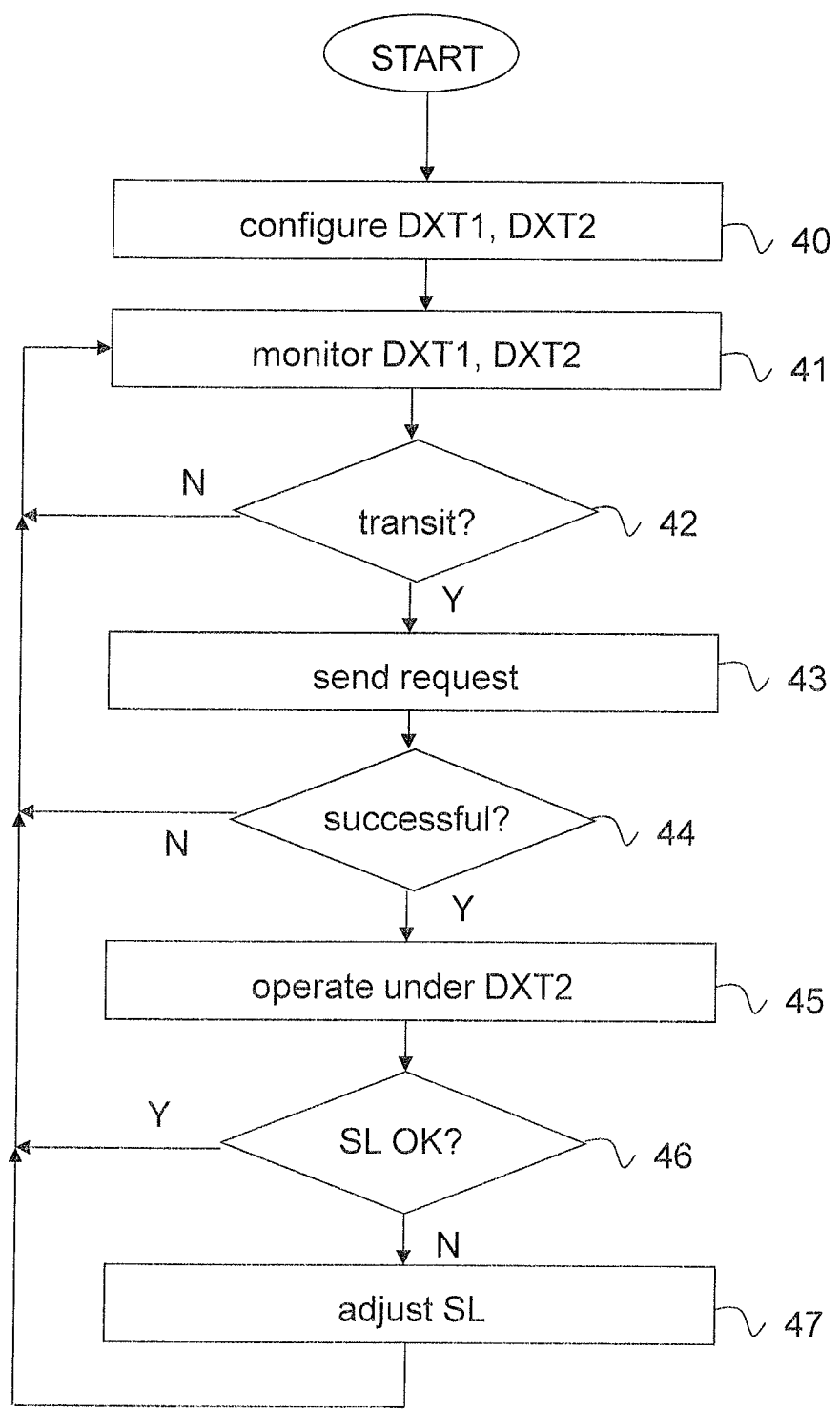
FIG. 4 illustrates a further aspect for the method illustrated in FIG. 3.

FIG. 4 illustrates a further aspect for the method illustrated in FIG. 3. Steps 40 to 45 correspond with steps 30 to 35 of FIG. 3 and their contents may be referred from earlier descriptions. The resources required to control a base station by an exchange vary according to the amount and type of ongoing services activated by the mobile stations operating under the base station. In order to further optimise the need to reserve and use resources in an exchange for operating as a secondary exchange, the base station may be configured to adjust its level of service according to the exchange it is operating under. Level of service may be adjusted by, for example, blocking some type of services, blocking some user groups from using some type of services, blocking bandwidths of some services, etc. For example, if operating under a secondary exchange is limited to exceptional situations, like catastrophes, it may be accepted that during these exceptional situations only a limited set of services are available to the mobile stations under the base station. For example, it is clear that in severe cases of emergency, it is important that voice communication is possible, but requests for packet data transmissions of application data may be rejected until normal operational connection to the default primary exchange is available. Further exemplary restriction could comprise restriction of communications to group communications, or to certain communication groups or subscriber classes only.

Accordingly, after transiting to the control of an exchange, the base station checks (stage 46) whether the service level it presently offers to the mobile stations matches with the level of interoperation with the present exchange. The level of interoperation of the base station with an exchange corresponds here with the amount of resources of the exchange the base station is expected or allowed to use during the period of interoperation. For example, the base stations may be configured with a list of available exchanges and service levels associated to each exchange. Based on this list the base station may decide whether an adjustment of service level (stage 47) is necessary or not. Alternatively, the exchanges may be configured to acknowledge a successful activation request by a message that also comprises an indication on the service level that it is prepared to offer during its interoperation with the base station. The way of implementing the check and associated adjustment is not relevant, as such, and may be implemented in various ways without deviating from the scope of protection.

Figure 5:
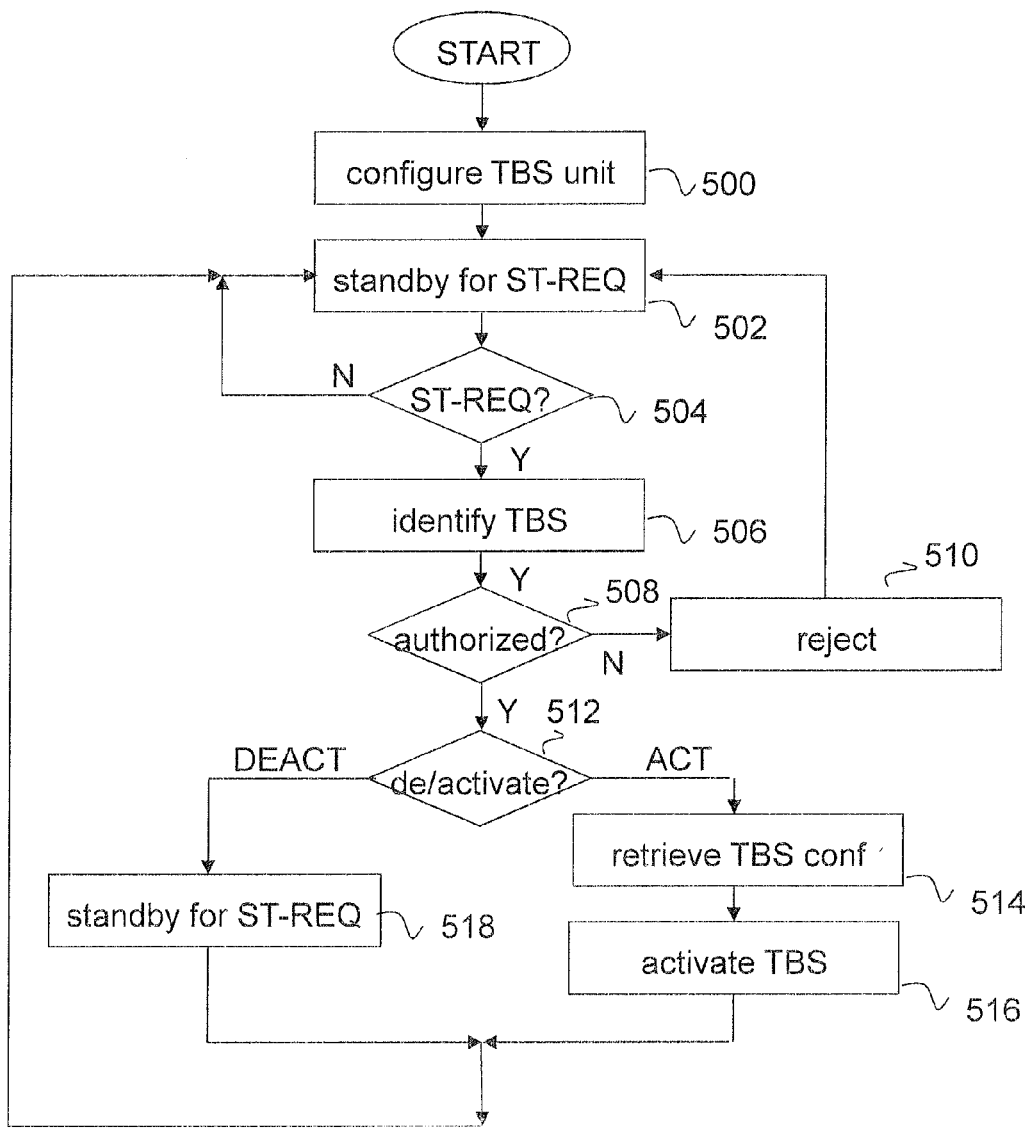
FIG. 5 illustrates a procedure implemented in an exchange of FIG. 1.

FIG. 5 illustrates an embodiment of a method according to the invention by means of a procedure implemented in the exchange DXT2 of FIG. 1. The procedure begins in the exchange DXT2 that is switched on and operable in the network, and thereby able via a signalling connection to exchange information with one or more base stations of the network. The exchange is configured (stage 500) with one or more base station units. A base station unit refers here to a logical combination of computing elements and programmed code running in the computing elements of the exchange, which combination provides means for controlling operations of one base station. Conventionally base station units have been configured and maintained in the exchange in active state or in idle state such that the exchange maintains the configuration information and state information of the base station. In active state the exchange also continuously controls and mediates their communication operations, whereas in idle state the exchange is idle but ready to immediately take the controlling role.

DTX2 comprises base station units that may be in active state or in standby state. In standby state a base station unit does not record state information on a specific base station, but comprises means for initiating a base station configuration for an identified base station. These means may be implemented as a procedure that is responsive to an activation request associated to a base station, retrieves base station configuration for the base station and results in triggering provision of control operations for the communications of that base station by the exchange. After the controlling relationship between the exchange and the base station is established, the exchange begins also to maintain state information of the base station.

As discussed above, in one aspect a standby base station unit may be implemented as a free agent that may be assigned to a specific base station when an activation request is received from the base station or the operator of the network, and may be released similarly when the primary exchange becomes accessible again. In order to improve security of the network, the standby base station unit may be configured with a security check that fails if the base station requesting activation of the base station unit is not an authorized base station allowed to interoperate with the exchange. In order to expedite the recovery process, the standby base station unit may also store configuration information that is common to all base stations in the network. Even quicker recovery may be achieved by maintaining also base station—specific configuration information on each of base stations of the network in the standby base station units. Base station state information that varies according to active services applied by mobile stations of the network do not, however, need to be received and recorded in the exchange. This means that the resources and capacity required by one standby unit is much lower than ones required by an active or idle base station unit.

After configuration of the base station units to the exchange, the exchange becomes standby (stage 502) to receive state transition requests ST-REQ from base stations or from the operator. A state transition request refers here to an activation request that triggers activation of a base station in the exchange or de-activation request that triggers de-activation of a base station in the exchange. If a state transition request is received (stage 504), the exchange extracts from the request identity of the base station in question (stage 506), and may also check whether the identified base station is allowed to communicate and/or interoperate with the exchange (stage 508). If not, the exchange rejects the state transition request (stage 510) and returns to stage 502 to monitor state transition requests. In case the state transition request of the base station is authorized, the exchange checks (stage 508) the type of the requested transition.

In case of an activation request, the exchange retrieves (stage 514) configuration information on the base station it has identified and possibly authorized. Depending on the implementation, the base station configuration information may be retrieved from the activation request, one or more memory elements or data repositories of the exchange, and/or from one or more a memory elements or data repositories accessible to the exchange, either in the own network or in a network connected to it. When the base station configuration information necessary for interoperation has been retrieved, the exchange activates the base station (stage 516) and begins to control and mediate operations of the base station accordingly.

In case of a de-activation request, the exchange de-activates (stage 518) the base station unit by, for example, discarding or de-activating the configuration information and the state information of the base station in question.

Figure 6:
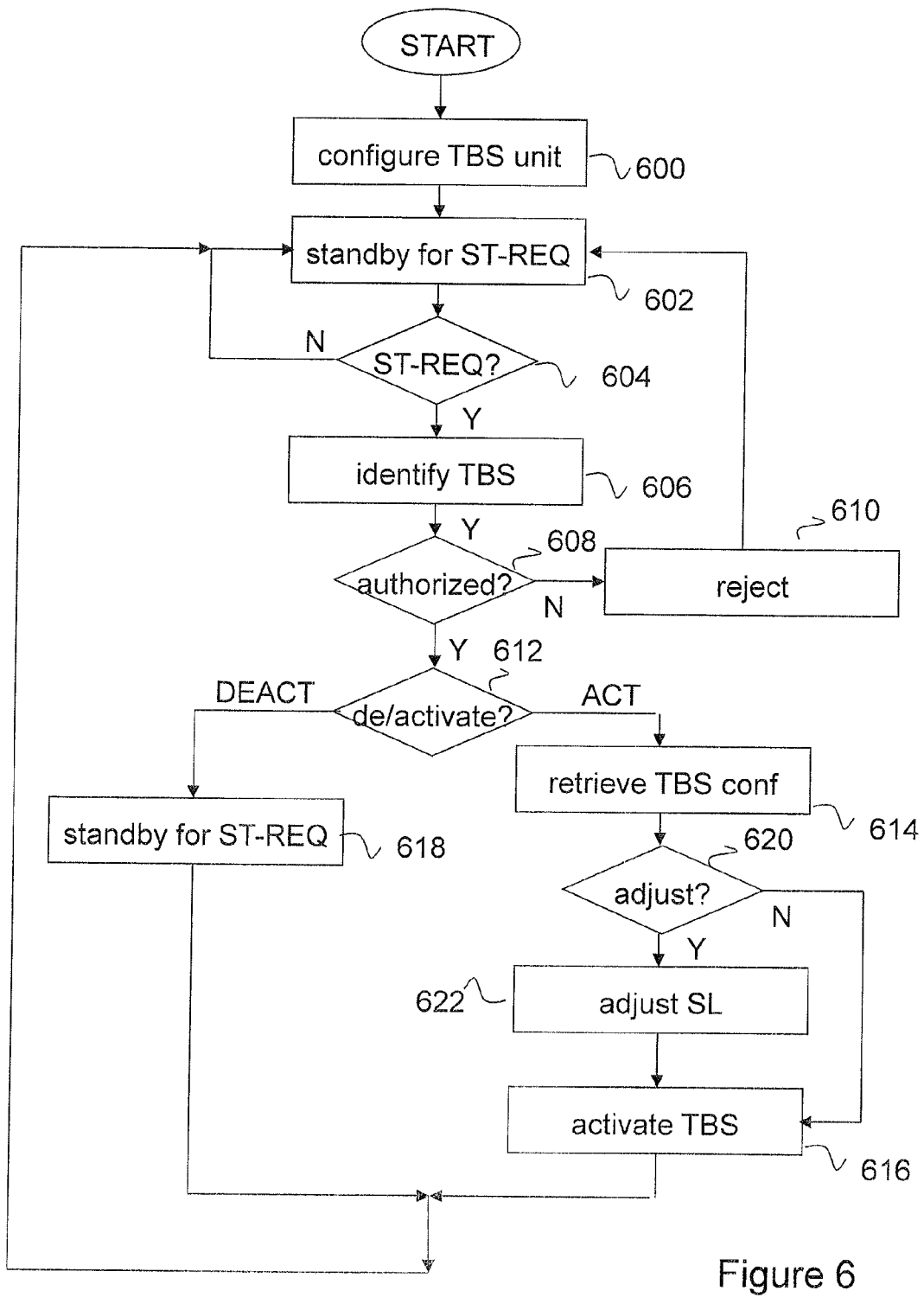
FIG. 6 illustrates a further aspect for the method illustrated in FIG. 5.

FIG. 6 illustrates a further aspect for the method illustrated in FIG. 5. As explained earlier, in severe cases of emergency, it is important that some services are available practically at all times. However, in order to achieve this with reasonable costs, organizations may define their operational activities to survive without some other communications services, for example without use of some applications that are not directly involved with tactical operations. Steps 600 to 618 correspond with steps 500 to 518 of FIG. 5 and their contents may be referred from earlier descriptions. However, after retrieving the base station configuration information, the exchange also checks (stage 620) whether the service level it presently offers to the activated base station matches with the resources (e.g. computing, storage, number of physical units, etc.) available in the exchange and dynamically adjusts the service level (stage 622) in case of mismatch. Service level offered by the exchange at a given time refers here to resources of the exchange made available to the base station at that time. The exchange may be configured to adjust service level of only those base stations to which it acts as a secondary exchange, or to adjust the service level of all base stations according to a predefined scheme, notwithstanding whether it acts as a primary or a secondary exchange to them.

For this check, the exchange may comprise a static rule to implement an adjustment at any time when a standby base station unit is taken into use. Alternatively, the exchange may comprise a table or ruleset of dynamic conditions that in response to predefined network conditions either trigger an adjustment or continue services in normal level. For example, the exchange may be configured to detect the number of standby units activated at the same time, and begin adjustment of service level when the amount of activated standby units exceeds a predefined level. If a need of adjustment is detected, the service level provided to the base station is modified accordingly. This arrangement enables covering visibility of recovery actions during smaller incidents and at the same time secures capacity for critical actions in a plurality of base stations in times of major incidents.

Figure 7:
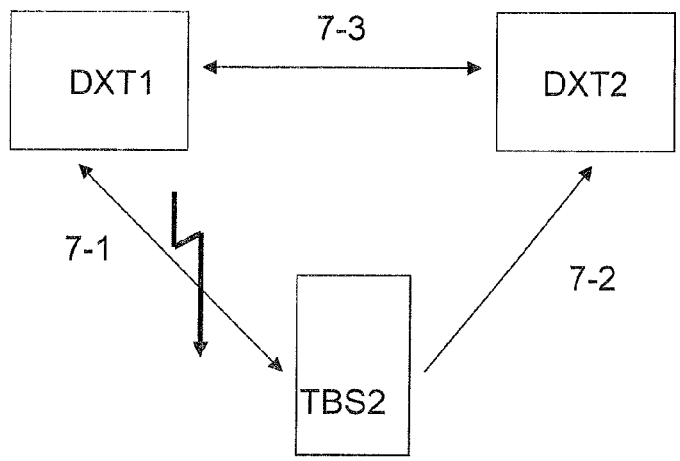
FIGS. 7 and 8 show use cases illustrating different implementations of the embodiments of the invention.
Figure 8:
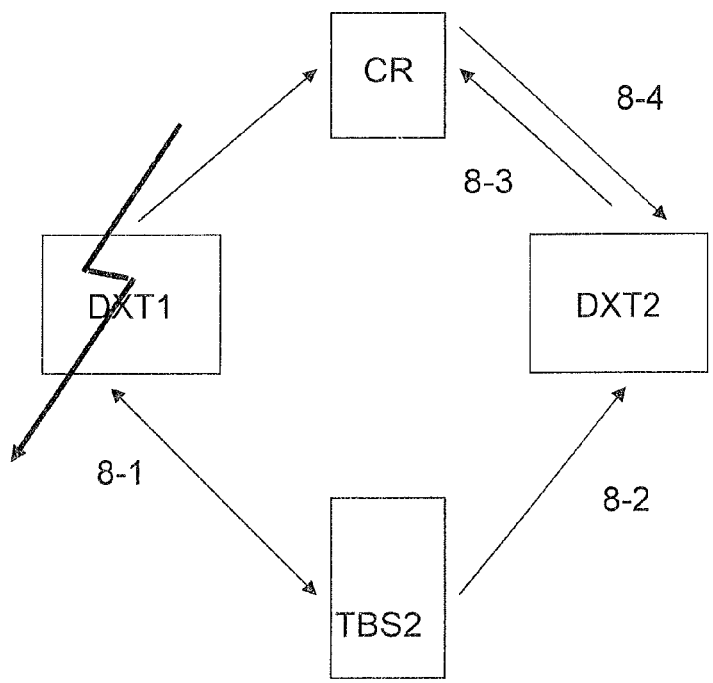

FIG. 7 and FIG. 8 show two use cases illustrating different implementations of the embodiments of the invention. FIG. 7 illustrates elements DXT1, DXT2 and TBS2 of FIG. 1 in a situation where transmission between the primary exchange DXT1 and the base station TBS2 is lost. The base station that has continuously monitored the connection and responsiveness of the present exchange DXT1 notices the break (7-1) and sends an activation request to a secondary exchange DXT2 (7-2). As discussed above, all necessary base station configuration information may be readily stored in the secondary exchange DXT2, or it may be made available to the secondary exchange DXT2 such that DXT2 can in response to the activation request automatically activate the base station TBS2. As soon as TBS2 has been activated, mobile stations in its cell start to register or re-register to the communications system through it, and gain access to the system after a relatively short break.

Once a mobile station registers to the system through the activated base station, the exchange that controls the base station needs to know which exchange in the system hosts the home subscriber database (HLR) for the registering mobile station. In the use case of FIG. 7, due to the type of service break, the transmission to and from the primary exchange DXT1 may operate normally. DXT1 may thus be allowed to continue hosting the HLR, even if the responsibility from the base station TBS2 has been transferred to DXT2. Alternatively, DXT2 may be configured to associate TBS2 to DXT1 and after identifying DXT1, try to retrieve also the HLR information from DXT1 (7-3). In addition to controlling TBS2, DXT2 can then provide HLR services of the DXT1. Information about HLR location change from DXT1 to DXT2 may need to be distributed throughout the other exchanges of the communications system. TBS2 may be configured to continue monitoring the availability of DXT1 for interoperation and trigger transition from DXT2 to DXT1 as soon as DXT1 becomes accessible.

FIG. 8 illustrates elements DXT1, DXT2 and TBS2 of FIG. 1 in a more severe situation where the whole primary exchange DXT1 is lost. The base station that has again continuously monitored the connection and responsiveness of the present exchange DXT1 notices the break (8-1) and sends an activation request to a primary exchange DXT2 (8-2). Again, all necessary base station configuration information is available to the secondary exchange DXT2 such that TBS2 can be activated. After this, mobile stations in the cell of TBS2 start to register or re-register to the communications system through it, and gain access to the communications system after a relatively short break.

This time DXT1 is incapacitated, so DXT2 can not retrieve the HLR information from DXT1. In order to cope with even situations like this, the network may comprise a core redundancy element CR. This element may be implemented as a server system to which individual exchanges send HLR information they manage during normal operations. For example, during their normal operation, exchanges DXT1 and DXT2 may be configured to continuously update (8-3) information in the home location register they manage to the core redundancy element CR. At the time of loss of DXT1, DXT2 that takes over responsibility of base stations of DXT1 can also retrieve (8-4) HLR information of DXT1 from the core redundancy element and again fully recover operations of DXT1.

As is implicitly evident from the above description, an exchange may be a primary exchange for one or more base stations, and a secondary exchange for one or more other base stations, the exchange detecting the one or more base stations for which the exchange is the primary base station. When acting as the primary exchange, the exchange records state information of the one or more base stations in an active and idle state. When acting as the secondary exchange, the exchange uses the active and standby states.

Figure 9:
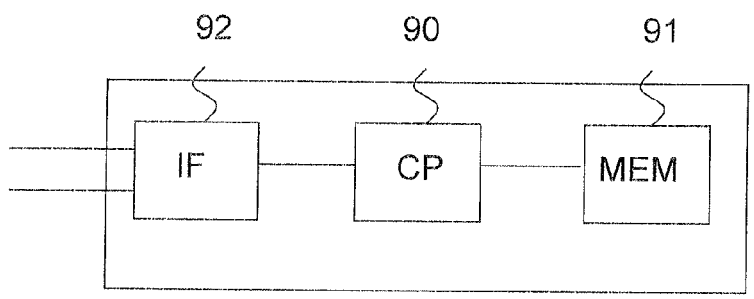
FIG. 9 shows a block diagram illustrating an exemplary architecture for an embodiment of a communicating entity.

A base station, an exchange and a base station unit described above are logical entities formed as a combination of physical computing equipment and a series of coded commands that implement operations presented for these logical entities in FIGS. 1 to 8. In the following description these logical entities are jointly referred to as a communicating entity. FIG. 9 shows a block diagram illustrating an exemplary architecture for an embodiment of a communicating entity, various operations of which have been described in detail above.

The communicating entity is a special-purpose computer device that comprises a processor unit 90 for performing systematic execution of operations upon data. The processor unit 90 is an element that essentially comprises one or more arithmetic logic units, a number of special registers and control circuits. Memory unit 91, which is data medium where computer-readable data or programs, or user data can be stored, is connected to the processor unit 90. The memory unit 91 typically comprises volatile or non-volatile memory, for example EEPROM, ROM, PROM, RAM, DRAM, SRAM, firmware, programmable logic, etc.

The device also comprises an interface unit 92 with at least one input unit for inputting data to the internal processes of the device and at least one output unit for outputting data from the internal processes of the device. If a line interface is applied, the interface unit typically comprises plug-in units acting as a gateway for delivering information from the interface unit to external connection wires and for receiving information from external connection wires to the interface unit.

If a radio or wireless interface is applied, which is the case in general with the base station, the interface unit typically comprises also a radio transceiver unit, which includes a transmitter and a receiver connected to an antenna. The radio interface is also electrically connected to the processor unit 90. The transmitter of the radio transceiver unit receives a bitstream from the processor unit 90, and converts it to a radio signal for transmission by the antenna. Correspondingly, the radio signals received by the antenna are fed to the receiver of the radio transceiver unit, which converts each radio signal into a bitstream that is forwarded for further processing to the processor unit 90. Different radio interfaces may be implemented with one radio transceiver unit, or with separate radio transceiver units which may be provided for different radio interfaces.

The interface unit 92 of the device may also comprise a user interface with a keypad, a touch screen, a microphone, and/or equals for inputting data and a screen, a touch screen, a loudspeaker, and/or equals for outputting data.

The processor unit 90, the memory unit 91, and the interface unit 92 are electrically interconnected to perform systematic execution of operations on the received and/or stored data according to the predefined, essentially programmed processes of the device. The systematic operation of these units thus provides means for the procedures, or means for performing one or more stages of the procedures, which have been described in more detail with each respective embodiment.

In general, various embodiments of the device may be implemented in hardware or special purpose circuits, software, logic or any combination thereof. Some aspects may be implemented in hardware, while some other aspects may be implemented in firmware or software, which may be executed by a controller, microprocessor or other computing device. Software routines, which are also called as program products, are articles of manufacture and can be stored in any device-readable data storage medium and they include program instructions to perform particular tasks. Thus the exemplary embodiments of this invention also provide computer program products, readable by a computer and encoding instructions for executing a process in the communicating entity of FIG. 9.

While various aspects of the invention may be illustrated and described as block diagrams, message flow diagrams, flow charts and logic flow diagrams, or using some other pictorial representation, it is well understood that the illustrated units, blocks, device, system elements, procedures and methods may be implemented in, for example, hardware, software, firmware, special purpose circuits or logic, a computing device or some combination thereof. Furthermore, it will be obvious to a person skilled in the art that, as the technology advances, the inventive concept can be implemented in various ways. The invention and its embodiments are not limited to the examples described above but may vary within the scope of the claims.

The invention claimed is:

1. A method, comprising:
   operating in a communications system as an exchange in a signalling connection with a base station;
   maintaining access to base station configuration information of the base station;
   maintaining in the exchange one or more base station units, the one or more base station units being either in an active state or in a standby state;
   receiving a state transition request message from the base station, the state transition corresponding to activation or de-activation of the base station in the exchange;
   changing the state of the base station in response to the state transition request,
   wherein in response to the active state of the base station unit for the base station, maintaining, by the exchange, configuration information and state information of the base station and controlling, by the exchange, communication operations between the exchange and the base station, and
   wherein in response to the standby state of the base station unit for the base station, not recording the state information, and comprising means for initiating a base station configuration for the base station.

2. A method according to claim 1, further comprising:
   in response to the state transition request comprising an activation request, retrieving the base station configuration information of the base station;
   using the base station configuration information to activate the base station.

3. A method according to claim 1, wherein the base station configuration information corresponds to information that is required to facilitate interoperability of the exchange and the base station but is not directly related to services applied by user terminals under the base station.

4. A method according to claim 1, further comprising receiving part of the base station configuration information included in the activation request message.

5. A method according to claim 4, further comprising retrieving the home subscriber information from the other exchange or from a home subscriber information redundancy database.

6. A method according to claim 1, further comprising storing base station configuration information in the exchange or in a database accessible to the exchange.

7. A method according to claim 1, further comprising:
   assigning a base station unit to the base station at activation;
   releasing the base station unit at de-activation.

8. A method according to claim 1, further comprising adjusting the level of service offered to the activated base station according to resources available in the exchange.

9. method according to claim 1, further comprising:
   retrieving home subscriber information of another exchange;
   providing the home subscriber information services of the other exchange to other exchanges.

10. A method for operating a telecommunications system, comprising:

configuring a base station to operate in a signalling connection under a primary exchange, the primary exchange being an exchange under which the base station is supposed to operate whenever possible;

maintaining access to configuration information of the base station in a secondary exchange, the secondary exchange being an exchange under which the base station is supposed to operate when the operation under the primary exchange is not possible;

maintaining in the secondary exchange one or more base station units, the one or more base station units being either in an active state or in a standby state;

monitoring state of interoperation between the base station and the primary exchange in the base station;

sending, in response to the state of interoperation with the primary exchange indicating that the primary exchange is unavailable, from the base station to a secondary exchange an activation request message, wherein in response to the activation request message, retrieving in the secondary exchange the configuration information of the base station;

using the retrieved base station configuration information to activate the base station in the secondary exchange, wherein in response to the active state of the base station unit for the base station, maintaining configuration information and state information of the base station and controlling, by the exchange, communication operations between the exchange and the base station, and wherein in response to the standby state of the base station unit for the base station, not recording the state information, and comprising means for initiating a base station configuration for the base station.

11. A telecommunications system comprising:

a base station;

a primary exchange for the base station, the primary exchange being an exchange under which the base station is supposed to operate whenever possible;

a secondary exchange for the base station, the secondary exchange being an exchange under which the base station is supposed to operate when the operation under the primary exchange is not possible;

one or more base station units, the one or more base station units being either in an active state or in a standby state, wherein in the active state to maintain configuration information and state information of the base station is maintained and control communication operations between the base station and the exchange under which the base station operates is controlled, in the standby state not to record the state information is not recorded, wherein the primary exchange and the secondary exchange are configured to comprise means for initiating a base station configuration for the base station when the base station unit is in the standby state;

the base station is configured to operate in a signalling connection under the primary exchange, to monitor state of interoperation between the base station and the primary exchange, to send, in response to the state of interoperation with the primary exchange indicating that the primary exchange is unavailable, to the secondary exchange an activation request message;

the secondary exchange is configured to maintain access to configuration information of the base station, and to retrieve, in response to the activation request message, the configuration information of the base station; and to use the retrieved base station configuration information to activate the base station in the secondary exchange.

12. An exchange comprising:

at least one receiver;

at least one transmitter;

at least one processor; and a computer program embodied in a non-transitory computer-readable medium;

the computer program embodied in a non-transitory computer-readable medium is configured, with the at least one processor, receiver and transmitter, the exchange at least to:

operate as an exchange in a signalling connection with a base station;

maintain access to base station configuration information of the base station;

maintain one or more base station units, the one or more base station units being either in an active state or in a standby state;

receive a state transition request message from the base station, the state transition corresponding to activation or de-activation of the base station in the exchange; and change the state of the base station in response to the state transition request, wherein the exchange is configured in the active state to maintain configuration information and state information of the base station and control communication operations between the exchange and the base station, and in the standby state not to record the state information, the exchange comprising means for initiating a base station configuration for the base station when the base station unit is in the standby state.

13. An exchange according to claim 12, wherein the computer program embodied in a non-transitory computer-readable medium is configured to, with the at least one processor, receiver and transmitter, further cause the apparatus at least to:

retrieve, in response to the state transition request comprising an activation request, the base station configuration information of the base station; and use the base station configuration information to activate the base station.

14. An exchange according to claim 12, wherein the base station configuration information corresponds to information that is required to facilitate interoperability of the exchange and the base station but is not directly related to services applied by user terminals under the base station.

15. An exchange according to claim 12, wherein the computer program embodied in a non-transistory computer-readable medium is configured to, with the at least one processor, receiver and transmitter, further cause the apparatus at least to:

assign a base station unit to the base station at activation; and release the base station unit at de-activation.

16. An exchange according to claim 12, wherein the computer program embodied in a non-transitory computer-readable medium is configured to, with the at least one processor, receiver and transmitter, further cause the apparatus at least to:

retrieve home subscriber information of another exchange; and provide the home subscriber information services of the other exchange to other exchanges.

17. An exchange according to claim 16, wherein the computer program embodied in a non-transitory computer-readable medium is configured to, with the at least one processor, receiver and transmitter, further cause the apparatus at least to retrieve the home subscriber information from the other exchange or from a home subscriber information redundancy database.

18. A non-transitory computer readable medium comprising computer program code which when run on a computer, will cause the computer to:
   operate in a communications system as an exchange in a signalling connection with a base station;
   maintain access to base station configuration information of the base station;
   maintain one or more base station units, the one or more base station units being either in an active state or in a standby state;
   receive a state transition request message from the base station, the state transition corresponding to activation or de-activation of the base station in the exchange; and
   change the state of the base station in response to the state transition request,
   wherein in response to the active state of the base station unit for the base station, maintaining, configuration information and state information of the base station and controlling, communication operations between the exchange and the base station, and,
   wherein in response to the standby state of the base station unit for the base station, not recording the state information, and comprising means for initiating a base station configuration for the base station.

* * * * *